(12) United States Patent
Olschewski et al.

(10) Patent No.: US 8,596,876 B2
(45) Date of Patent: Dec. 3, 2013

(54) BEARING ASSEMBLY

(75) Inventors: Armin Olschewski, Schweinfurt (DE); Arno Stubenrauch, Aidhausen (DE)

(73) Assignee: Aktiebolaget SKF, Göteborg (SE)

( * ) Notice: Subject to any disclaimer, the term of this patent is extended or adjusted under 35 U.S.C. 154(b) by 168 days.

(21) Appl. No.: 13/233,675

(22) Filed: Sep. 15, 2011

(65) Prior Publication Data

US 2012/0067152 A1 Mar. 22, 2012

(30) Foreign Application Priority Data

Sep. 22, 2010 (DE) .......................... 10 2010 041 186
Dec. 15, 2010 (DE) .......................... 10 2010 063 132

(51) Int. Cl.
*F16C 33/58* (2006.01)
(52) U.S. Cl.
USPC .......................................... 384/569; 384/564
(58) Field of Classification Search
USPC ......... 384/551, 564, 565, 569, 618, 619, 622, 384/548; 290/55
See application file for complete search history.

(56) References Cited

U.S. PATENT DOCUMENTS

| | | | | |
|---|---|---|---|---|
| 3,954,313 | A * | 5/1976 | Haenel | 384/569 |
| 4,203,634 | A * | 5/1980 | Back | 384/489 |
| 4,265,497 | A * | 5/1981 | Eickmann | 384/564 |
| 2010/0197446 | A1* | 8/2010 | Smook | 475/346 |

FOREIGN PATENT DOCUMENTS

| | | |
|---|---|---|
| DE | 821887 C | 11/1951 |
| DE | 19827859 A1 | 12/1999 |
| DE | 102004038709 A1 | 2/2006 |
| DE | 102005049185 A1 | 4/2007 |
| DE | 102007053526 A1 | 5/2009 |
| EP | 0328496 A2 | 8/1989 |
| EP | 1553315 A | 7/2005 |
| JP | 2001099168 A | 4/2001 |
| JP | 2004308750 A | 11/2004 |
| JP | 2007100921 A | 4/2007 |
| JP | 2009008215 A | 1/2009 |

* cited by examiner

*Primary Examiner* — Phillip A Johnson
(74) *Attorney, Agent, or Firm* — Bryan Peckjian; SKF USA Inc. Patent Department

(57) ABSTRACT

A roller bearing comprises at least two rows of rollers disposed between an inner ring and an outer ring. At least two tracks guide the respective rows of roller and are defined in the axial direction of the inner ring or the outer ring. At least one flange abuts axial ends of axially-adjacent rows of rollers and extends radially from a radially outer side or a radially inner side of the inner ring or the outer ring. At least one recess is defined on the side of the inner ring or the outer ring that is opposite of the radially outer side or the radially inner side of the inner ring or the outer ring, from which the at least one flange radially extends. The at least one recess at least partially overlaps the at least one flange in the axial direction.

20 Claims, 2 Drawing Sheets

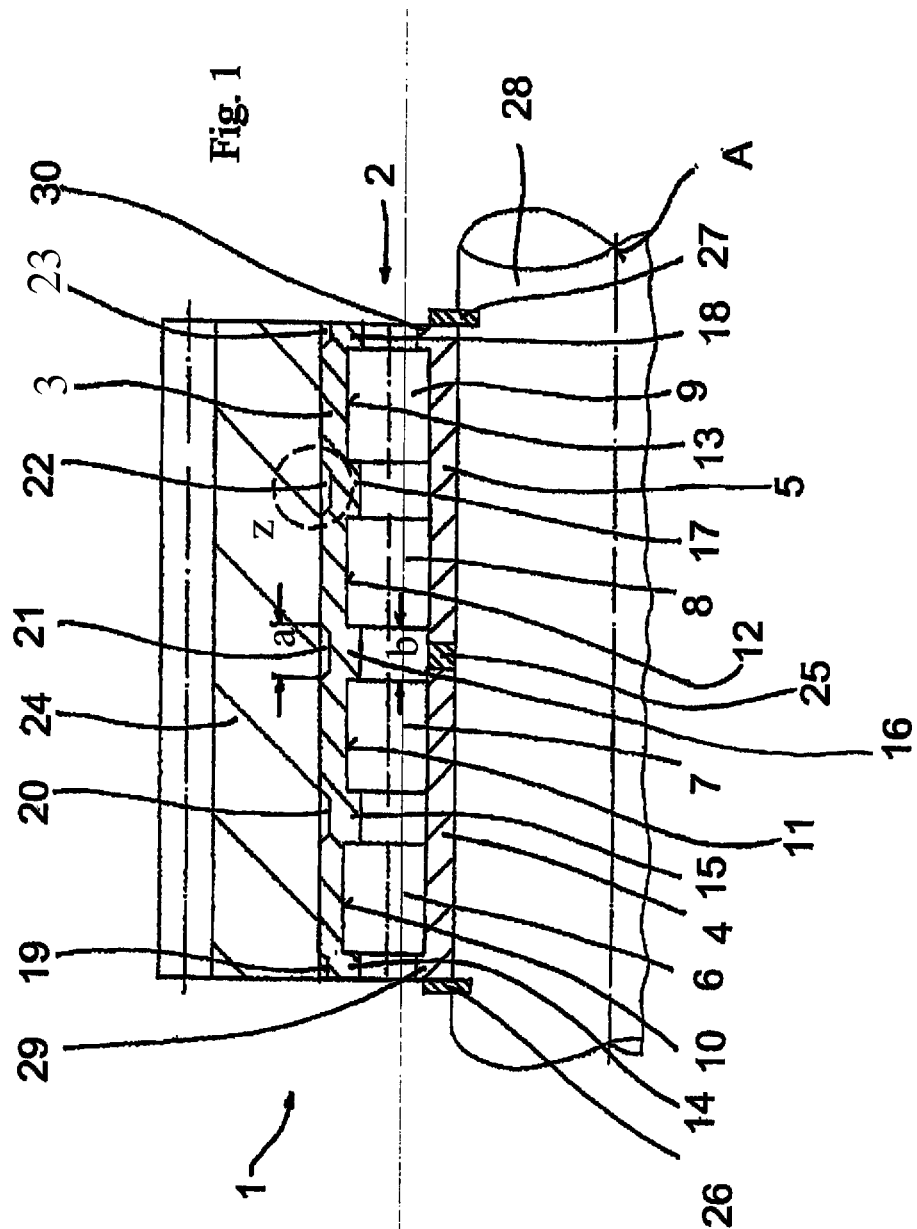

BEARING ASSEMBLY

CROSS-REFERENCE

This application claims priority to German patent application no. 10 2010 041 186.8 filed on Sep. 22, 2010 and to German patent application no. 10 2010 063 132.9 filed on Dec. 15, 2010, the contents of both of which are incorporated herein by reference as if fully set forth herein.

TECHNICAL FIELD

The present invention relates to bearings and bearing assemblies having at least two rows of roller bodies.

BACKGROUND ART

Bearing assemblies are known that comprise an at least two-rowed roller bearing having at least one outer ring, at least one inner ring and at least two rows of roller bodies disposed between the inner ring and the outer ring. At least one of the bearing rings may define at least two adjacently-disposed tracks for the two rows of roller bodies. A radially-extending flange configured to abut the axial ends of the axially-adjacent roller bodies may disposed between each two tracks.

Two or more parallel rows of roller bodies are provided in order to be able to support large bearing forces. For example, a four-rowed cylindrical roller bearing can support large radial forces and can be utilized to rotatably support a rotor of a wind turbine. Such bearings can also be utilized, e.g., to rotatably support a gear wheel of a transmission, such that large radial loads on a shaft for the gear wheel can be supported. In such an embodiment, helical-cut spur gears are, in most cases, utilized in the transmission and are required in planetary gear transmissions. Therefore, in addition to the radial loads, axial loads must also be supported when such bearing designs are utilized. By providing the radial-extending flange(s) on the bearing rings, the axial ends of the roller bodies (e.g., cylindrical rollers) can axially abut on the flange(s) of the bearing ring so as to also support axial loads.

SUMMARY

However, such a bearing design may be disadvantageous for relatively large axial loads, because the cylindrical rollers are often subjected to loading with a tilting moment. As a result, they will not stay in the optimal position, i.e. in the position, in which their rotational axes are parallel to the rotational axis of the bearing.

The disadvantageous consequences thereof are increased wear of the bearing and an overall untrue rotation of the bearing.

In one aspect of the present teachings, such a bearing assembly may be improved so that the above-mentioned disadvantages can be overcome in a simple and cost-effective manner. In such embodiments, the tilting tendency of the roller bodies remains low, even in case a larger axial load must be supported in such a bearing, thereby ensuring satisfactory operating performance with low wear.

In another aspect of the present teachings, the bearing ring that carries the at least one flange may also include at least one recess in the area of the axial extension (length) of at least one flange. The recess is preferably disposed on the radially outer side or the radially inner side of the bearing ring that is opposite of the side of the bearing ring, from which the flange radially extends. Thus, the recess(es) at least partially (more preferably, preferably at least substantially) superimpose(s) the flange(s) in the axial direction of the bearing assembly. That is, the recess(es) has (have) a length in the axial direction that at least partially (more preferably, preferably at least substantially) overlaps the length of the flange(s) in the axial direction. Further, the recess(es) preferably may be defined only within the axial extension (length) of the flange(s), such that the recess(es) do(es) not extend up to, but not beyond the axial extension (length) of the flange(s). However, in certain embodiments, the recess(es) may extend beyond the axial extension (length) of the flange(s).

Preferably, the at least one recess is formed as an annular groove. Further, the at least one recess is preferably free of disturbances in the area of its axial extension (length), in particular free of lubricating holes. The latter could negatively influence the desired strain relief provided by the at least one recess.

In another aspect of the present teachings, an outer ring of the bearing includes the at least one flange and the at least one flange preferably extends radially inwardly. The at least one recess may be, e.g., machined or cut into the outer circumferential surface of the outer ring.

The axial extension (i.e. the length in the axial direction) of the recess(es) is preferably between 80% and 120% of the axial extension (i.e. the length in the axial direction) of the flange(s), more preferably about 100% of the axial extension of the flange(s).

The recess(es) can be formed, e.g., as a circular groove. In the alternative, the recess(es) can be formed, e.g., as a curl, which is advantageous with respect to notch stresses.

In another aspect of the present teachings, the recess(es) can have, e.g., a rectangular shape in radial cross-section. In the alternative, the recess(es) may have a trapezoid shape in radial cross-section; in such an embodiment, the side angle of the trapezoid shape is preferably between 30° and 60° relative to the rotational axis of the roller bearing. In a further alternative embodiment, the recess(es) may have a trough-shaped or bowl-shaped (e.g., curved) contour in radial cross-section.

The bearing assembly preferably may be utilized as a component of a wind turbine. In such an embodiment, a helical-cut gear wheel of a transmission, e.g., a planetary gear transmission, may be disposed on (preferably, affixed to) the outer ring(s) of the roller bearing. In this case, axial forces, which necessarily arise during operation and must be supported, do not lead to a tilting of the roller bodies, thereby improving the operating performance.

The bearing ring is preferably formed as one-pieced or integral at least in the area of the recess(es). This applies in particular to embodiments, in which the recess(s) is (are) defined in the bearing outer ring.

By providing the above-described recess(es), the bending stiffness of the bearing ring is intentionally weakened about an axis perpendicular to the rotational axis. Therefore, large axial loads no longer lead to a loading of the roller bodies with a tilting moment. Rather, the roller bodies are better able to stay in their optimal position, i.e. in which the rotational axis of each roller body stays parallel to the rotational axis of the bearing.

Thus, in one or more of the embodiments disclosed herein, the operating performance of the bearing may be improved and/or the wear of the bearing may be reduced, thereby increasing the service life of the bearing.

Further objects, embodiments, advantages and designs will be explained in the following with the assistance of the exemplary embodiments and the appended Figures.

BRIEF DESCRIPTION OF THE DRAWINGS

FIG. 1 shows a radial cross-section of a bearing assembly that includes a four-rowed cylindrical roller bearing, with which a gear wheel of a planetary gear transmission of a wind turbine optionally may be rotatably supported.

DETAILED DESCRIPTION OF THE INVENTION

Figure 2A:
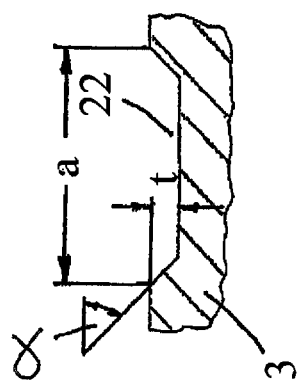
FIG. 2a shows the structures within circle "Z" according to a first embodiment.

The bearing assembly 1 illustrated in FIG. 1 may be utilized to rotatably support a gear wheel 24 disposed around a shaft 28 of a planetary gear transmission of a wind turbine. In preferred embodiments, the gear wheel 24 is a helical-cut spur gear, which means that axial forces are also generated during operation and must be supported by the roller bearing 2 of the bearing assembly 1. Although the preferred usage of the present teachings is in a gear transmission of a wind turbine, the present teachings may be advantageously applied to any situation, in which both radial and axial forces must be supported by a bearing.

The representative roller bearing 2 shown in FIG. 1 is preferably configured as a four-rowed cylindrical roller bearing in the present embodiment, although the present teachings are applicable to any type of multi-rowed bearing. Although not necessary in all embodiments of the present teachings, the outer ring (race) 3 of the bearing of the present embodiment is preferably one-piece. The outer ring 3 includes four roller body tracks (or races) 10, 11, 12 and 13 that are disposed in series (spaced) in the axial direction of the roller bearing 2. The tracks 10, 11, 12 and 13 serve as guides for the four rows of cylindrical rollers 6, 7, 8, 9 respectively disposed therein.

A radially-inwardly-extending flange 15, 16, 17 is disposed between each two tracks and thus between each two axially-adjacent rows of roller bodies 6, 7, 8, 9. Similar flanges 14 and 18 are also respectively provided at the axial end portions of the outer ring 3. The flanges 14, 15, 16, 17, 18 are configured to abut the respective axial ends of the roller bodies in the axial direction, while allowing slippage, so that the roller bodies are supported in the axial direction but are still capable of performing their bearing function (i.e. moving and/or rotating between the bearing rings or races).

The roller bearing 2 preferably includes two inner rings (races) 4 and 5 with corresponding inner ring tracks for the four rows of cylindrical rollers 6, 7, 8, 9, although one or more inner rings may be utilized in other aspects of the present teachings. A spacer ring 25 may be disposed between the two inner rings 4, 5. Each of the two inner rings 4, 5 includes a flange 29 and 30 at the respective axial end portions of the roller bearing 2. Therefore, it is possible to transmit axial forces via the outer ring 3 and the roller bodies 6, 7, 8, 9 to the inner rings 4, 5. The roller bearing 2 is affixed on the shaft 28 in the axial direction by two retaining rings so that a fixed bearing unit results.

The outer ring 3 carrying or supporting the flanges 14, 15, 16, 17, 18 includes at least one recess 19, 20, 21, 22, 23 in the area of the axial extension (i.e. the length of the flange in the axial direction of the roller bearing 2) of each flange. These recesses 19, 20, 21, 22, 23 are defined on the outer circumferential surface of the outer ring 3, i.e. on the radially outer side of the bearing ring 3 that is opposite to the radially-inner side, from which the flanges 14, 15, 16, 17, 18 extend radially inward.

Figure 2B:
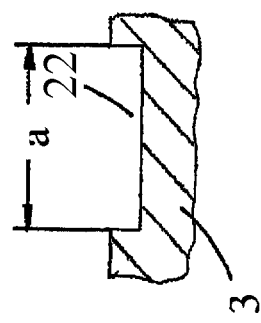
FIG. 2b shows the structures within circle "Z" according to a second embodiment.
Figure 2C:
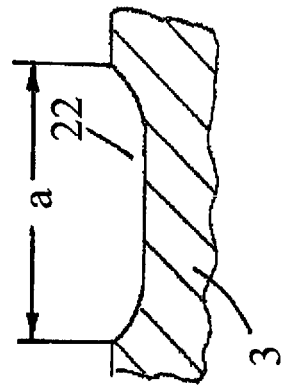
FIG. 2c shows the structures within circle "Z" according to a second embodiment.

Representative, non-limiting designs of the recesses 19, 20, 21, 22, 23 are shown in FIGS. 2a, 2b and 2c. In particular, only recess 22 is illustrated for clarity purposes, but it can be understood that the designs shown in FIGS. 2a, 2b and 2c are applicable to all of the recesses 19, 20, 21, 22, 23.

As can be seen in the above-mentioned Figures, each recess 19, 20, 21, 22, 23 extends along an extension (length) a in the direction (axial direction) of the rotational axis A of the roller bearing 2. The corresponding axial extension (length) of the flange 14, 15, 16, 17, 18 is denoted with b (see FIG. 1). In particularly preferred embodiments, the axial extension b of the flanges and the axial extension a of the corresponding recesses are approximately equally long.

As shown in FIGS. 2a, 2b and 2c, different shapes for the recess can be utilized and three representative, non-limiting shapes are shown for illustration purposes. Other recess shapes also may be utilized in accordance with the present teachings.

FIG. 2a shows a trapezoid-shaped design. The side trapezoid angle is indicated with α and it is preferably about 30° to 60° relative to the rotational axis A of the roller bearing 2.

In FIG. 2a, a rectangular-shaped design of the recess 19, 20, 21, 22, 23 is exemplified.

FIG. 2c shows a trough-shaped (i.e. at least partially curved) contour for the recess 19, 20, 21, 22, 23.

The radial depth t of each recess 19, 20, 21, 22, 23 is preferably between 1 mm and 10 mm, more preferably between 2 mm and 5 mm.

In the exemplary embodiment of FIG. 1, a one-piece outer ring 3 having four tracks is illustrated. The four rows of cylindrical rollers cooperate together with the two bearing inner rings, and the spacer ring 25 is disposed between the two inner rings 4, 5.

However, other embodiments within the scope of the present teachings are possible in a similar manner.

For example, two outer rings, each having two tracks, may be utilized. In this case, the two outer rings may be retained in a spaced relationship by a spacer ring. In such an embodiment, the four rows of cylindrical rollers optionally can cooperate with two inner rings that abut against each other, i.e. between which no spacer ring is disposed. The inner rings may be free of flanges at the axial contact points; nevertheless, they preferably have a flange on each of their axially-outer-lying ends (as in FIG. 1). In this case, the outer rings may each have three flanges that axially border the two tracks.

A recess may be provided at each section on the outer circumference of the outer ring, from which a flange extends. Each recess preferably has an axial length that at least substantially corresponds to the axial length of the respective flange, more preferably the respective axial lengths are equal.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

LIST OF REFERENCE NUMBERS

1 Bearing assembly
2 Roller bearing
3 Outer ring
4 Inner ring
5 Inner ring
6 Roller body
7 Roller body
8 Roller body
9 Roller body
10 Track
11 Track
12 Track
13 Track
14 Flange
15 Flange
16 Flange
17 Flange
18 Flange
19 Recess
20 Recess
21 Recess
22 Recess
23 Recess
24 Gear wheel
25 Spacer ring
26 Retaining ring
27 Retaining ring
28 Shaft
a axial extension (length) of the recess
b axial extension (length) of the flange
α angle
A rotational axis
t radial depth

The invention claimed is:

1. A bearing assembly including an at least two-rowed roller bearing comprising:
   at least one outer ring,
   at least one inner ring and
   at least two rows of roller bodies disposed between the inner ring and the outer ring,
   wherein at least one of the inner ring and the outer ring includes at least two tracks disposed axially adjacent to each other and configured to respectively guide the at least two rows of roller bodies,
   at least one flange is configured to abut axial ends of the roller bodies and extends radially from a radially outer side or a radially inner side of at least one of the inner ring and the outer ring between the at least two tracks,
   at least one recess is defined on the at least one of the inner ring and the outer ring, from which the at least one flange radially extends, within a length of the at least one flange in an axial direction of the roller bearing, and
   the at least one recess is disposed on the radially outer side or the radially inner side of at least one of the inner ring and the outer ring that is opposite of the radially outer side or the radially inner side, from which the at least one flange radially extends, the at least one recess at least partially overlapping the at least one flange in the axial direction.

2. The bearing assembly according to claim 1, wherein the at least one recess is defined as an annular groove.

3. The bearing assembly according to claim 2, wherein the at least one flange extends radially inwardly from the outer ring and the at least one recess is defined within an outer circumferential surface of the outer ring.

4. The bearing assembly according to claim 3, wherein the axial length of the recess is between 80% and 120% of the axial length of the flange.

5. The bearing assembly according to claim 4, wherein the axial length of the recess is at least substantially equal to the axial length of the flange.

6. The bearing assembly according to claim 5, wherein the recess is one of a rectangular-shaped, trapezoidal-shape and curved in radial cross-section.

7. The bearing assembly according to claim 6, wherein the recess has a radial depth of 2-5 mm.

8. The bearing assembly according to claim 7, wherein:
   at least four rows of cylindrical rollers are disposed between the outer ring and the inner ring in the axial direction of the roller bearing,
   one flange extends radially inwardly from the outer ring between each two axially-adjacent rows of cylindrical rollers so as to axially abut axial ends of the cylindrical rollers, and
   recesses are respectively defined within the outer circumferential surface of the outer ring at locations that are radially adjacent to each flange.

9. The bearing assembly according to claim 1, wherein the at least one recess is free of disturbances along its axial length.

10. The bearing assembly according to claim 1, wherein the at least one flange extends radially inwardly from the outer ring and the at least one recess is defined within an outer circumferential surface of the outer ring.

11. The bearing assembly according to claim 1, wherein the axial length of the recess is between 80% and 120% of the axial length of the flange.

12. The bearing assembly according to claim 1, wherein the recess is defined as one of a circular groove and a curl.

13. The bearing assembly according to claim 1, wherein the recess has a rectangular shape in radial cross-section.

14. The bearing assembly according to claim 1, wherein the recess has a trapezoid shape in radial cross-section and a side angle of the trapezoid shape is between 30° and 60° relative to a rotational axis of the roller bearing.

15. The bearing assembly according to claim 1, wherein the recess has a trough-shaped contour in radial cross-section.

16. A wind turbine comprising:
   the bearing assembly according to claim 1, and
   a helical-cut gear wheel of a transmission disposed on the outer ring of the roller bearing.

17. A roller bearing comprising:
   at least one outer ring,
   at least one inner ring,
   at least two axially-adjacent rows of roller bodies disposed between the inner ring and the outer ring,
   at least two tracks configured to respectively guide the at least two rows of roller bodies, the at least two tracks being defined in an axial direction of at least one of the inner ring and the outer ring,
   at least one flange configured to abut axial ends of axially-adjacent rows of roller bodies, the at least one flange extending in a radial direction from a radially outer side or a radially inner side of at least one of the inner ring and the outer ring, and at least one recess defined on a side of the at least one of the inner ring and the outer ring that is opposite of the radially outer side or the radially inner side of at least one of the inner ring and the outer ring, from which the at least one flange radially extends, the at least one recess at least partially overlapping the at least one flange in the axial direction.

18. The roller bearing according to claim 17, wherein the at least one flange extends radially inwardly from the outer ring and the at least one recess is defined within an outer circumferential surface of the outer ring.

19. The roller bearing according to claim 18, wherein the recess has a length in the axial direction that is between 80% and 120% of the length of the at least one flange in the axial direction.

20. The bearing assembly according to claim 19, wherein the recess is one of a rectangular-shaped, trapezoidal-shape and curved in radial cross-section and has a radial depth of 2-5 mm.

\* \* \* \* \*